May 12, 1931. W. H. TOPP 1,804,570
BRAKE ACTUATING MECHANISM
Filed Aug. 30, 1928 2 Sheets-Sheet 2
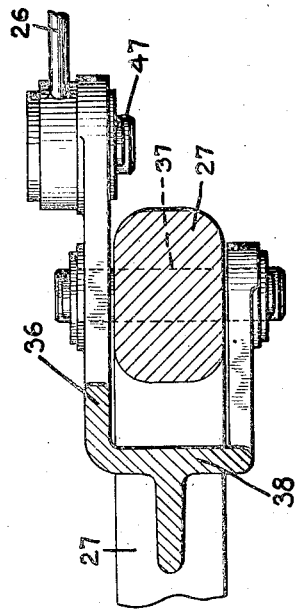
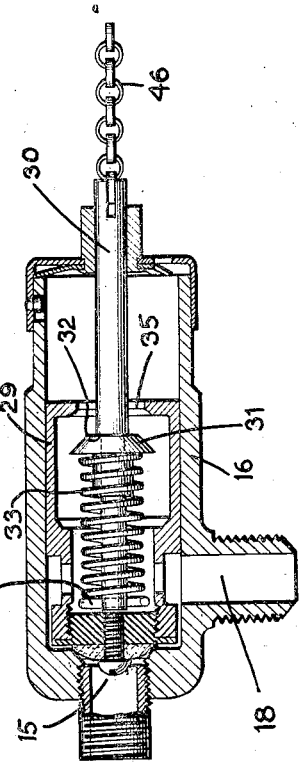
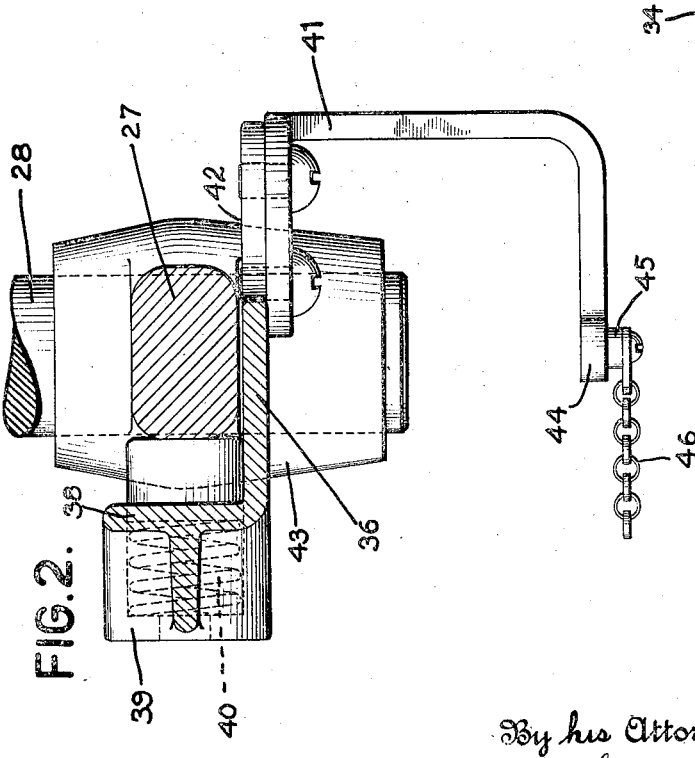
Inventor
WILLIAM H. TOPP
By his Attorney
George F. Des Marais Patented May 12, 1931

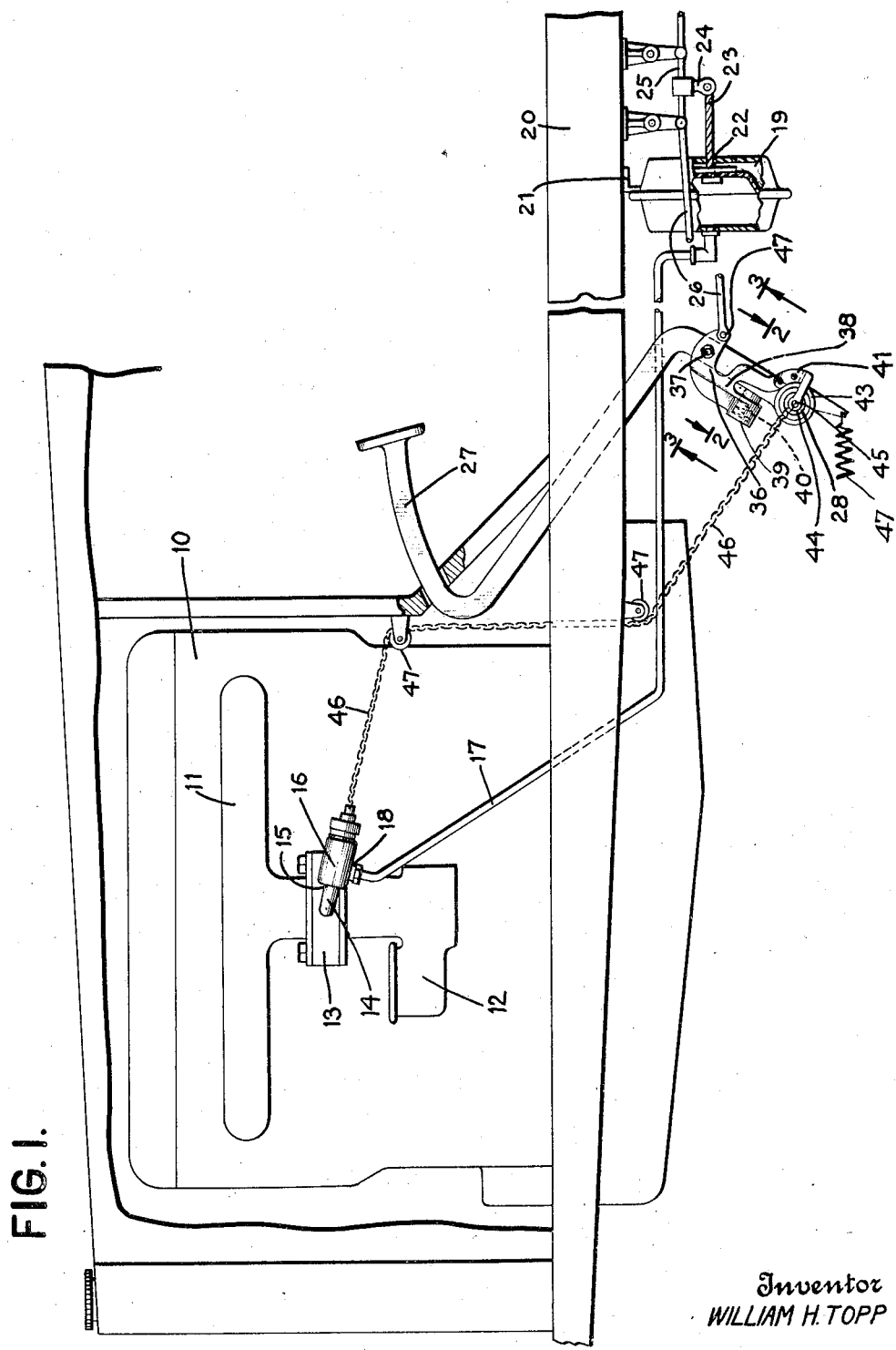

1,804,570

UNITED STATES PATENT OFFICE

WILLIAM H. TOPP, OF RICHMOND, INDIANA, ASSIGNOR, BY MESNE ASSIGNMENTS, TO THE STARR PIANO COMPANY, OF RICHMOND, INDIANA, A CORPORATION OF INDIANA

BRAKE ACTUATING MECHANISM

Application filed August 30, 1928. Serial No. 302,948.

This invention relates to brake systems and to brake operating mechanism and particularly to a brake system wherein the brakes are operable as the result of manual effort, or as the result of combined manual and power effort.

Among the objects of the invention is to provide a mechanism having means for causing a braking force to be applied to the brakes of a vehicle by and under the control of a foot treadle, the braking force being largely created by the power means which is controllable by the operation of the foot treadle to apply any desired force to the brakes.

Another object of the invention is to provide a brake operating system which may be easily installed on an automobile having the usual pedal for applying the brakes.

Other objects and advantages will be disclosed in the accompanying description and in the drawings, in which:

Fig. 1 is a general side view of the brake operating mechanism.

Fig. 2 is a detail on line 2—2 of Fig. 1.

Fig. 3 is a detail on line 3—3 of Fig. 1.

Fig. 4 is a longitudinal section of the valve illustrated in Fig. 1.

In the drawings there is conventionally illustrated a motor 10 having the usual intake manifold 11 and carburetor 12. Intermediate the manifold and the carburetor there is a connection 13 designed to serve as a means for connecting conduit 14 with a source of suction, that is, with the manifold 11. Conduit 14 is in communication with one port 15 of control valve 16, and conduit 17, which is in communication with another port 18 of valve 16, is connected with a pneumatic motor 19. The motor here illustrated has a movable diaphragm which is responsive to differences of pressure and which is flexibly secured at its edge to the casing of the pneumatic motor, the casing of the pneumatic motor being secured to the chassis 20 by means of clips 21.

The movable diaphragm of the pneumatic motor has connection with a piston rod 22 which is adapted to be drawn to the left, Fig. 1, as the pneumatic motor is placed in operation. A flexible member or cable 23 is connected with piston rod 22 at one end and at its other end it is connected with a bracket 24, mounted on rodding 25. This rodding may be of any usual type used on automobiles for transmitting the pull of the brake operating means to the brakes (not shown). In common constructions where the brake operating means comprises the brake pedal, a rod 26 is connected with the brake rodding 25 and with a brake pedal 27 or other pivotally mounted element which is associated with a brake pedal. The brake pedal 27, being pivoted upon a shaft 28, will cause the rod 26 to be drawn to the left when the brake pedal is depressed.

Brake systems have heretofore been devised in which power operating means such as a pneumatic motor is caused to be operated by the suction created by the automobile engine at the manifold. The utilization of the suction at the manifold is under the control of a control valve. The control valve disclosed herein has a cylindrical bore and at one end there is a port 15 having connection with conduit 14 leading to the intake manifold. Port 18 is attached to the side of the casing of the control valve 16 at a point near port 15. In general, the control valve is designed (1) to close off all communication through port 15; (2) to permit or prevent communication of port 18 with the atmosphere; and (3) to permit communication, in varying degrees, between ports 15 and 18.

The control valve here illustrated for accomplishing these purposes has a slidable cylindrical hollow member 29 which has a closed end which is adapted to seat at the left end of the valve casing and close port 15. Stem 30 provides for transmitting motion to the member and it carries the valve 31 which is movable axially along the stem but is limited in its motion in one direction in respect to the stem by a shoulder 32 and in the other direction by a spring 33 disposed on the stem between a pin 34 at one end of the stem and valve 31. When the stem 30 is pulled the force applied thereto is transmitted through pin 34 and spring 33 so that valve 31 may be moved to close atmospheric port 35. In closing, the atmospheric port 35 causes discontinuance of communication of the atmosphere with conduit 17 and, hence, with the low pressure side of the diaphragm of the pneumatic motor 19. Further pull on stem 30 causes spring 33 to be compressed to such an extent that when its force of reaction is equal or greater than the force of the suction upon member 29 at port 15, member 29 will be displaced and port 15 will be uncovered. Movement of the member 29 to the right causes port 15 to be uncovered and to be placed into communication with port 18 so that the suction existing in the manifold is caused to be communicated to a more or less extent to conduit 17 and the low pressure side of the pneumatic motor 19. The amount of suction caused to be so brought into communication with the low pressure side of pneumatic motor 19 is dependent upon the amount of displacement of member 29. It is clear that the suction at the intake manifold will tend to draw member 29 to its seated position and that so long as it is desired to have low pressure conditions in the pneumatic motor 19 it will be necessary to maintain member 29 unseated. Since there is a continued tendency to reseat because of the suction at port 15, member 29 will tend to assume its own position and find a balance between the resilient effort of spring 33 and the force of the suction upon member 29.

My device embodies the idea of controlling the operation of the control valve 16 by means of a device associated with the ordinary brake pedal of an automobile so that when the brake pedal is depressed the control valve will be caused to function and, in turn, control the operation of the pneumatic motor for applying the brakes. The device by which I accomplish the purposes desired comprises, in its present embodiment, a member 36 carried by the brake lever 27 and pivotally mounted thereon by a pin 37. This member 36 is so shaped as to have a forward portion 38, Fig. 2, overlying the forward edge of the brake pedal 27 and carrying thereon at one end a bored boss 39 in which a spring 40 constantly urges a thimble or bearing block into contact with the forward edge of brake pedal 27. The relation of the force transmitting means comprising rodding 25, to the pedal 27 when the brakes are in a normal released position is illustrated in Fig. 1. While the brake springs may be relied upon for returning the pedal to normal position, a spring 47 may be provided to supplement the restoring force acting upon pedal 27. It is evident that in the inoperative positions of member 36 and pedal 27 the pivotal connection at 47 of member 36 with rod 26 is such as to lie outside of a direct line drawn through pin 37 and the point of connection of rod 26 and rodding 25.

It is apparent from the foregoing that a depression of pedal 27 will cause counterclockwise rotation of pedal 27 and of member 36 about shaft 28, member 36 being carried by the pedal 27. Any tendency to resist the counterclockwise motion of pedal 27 by reason of the counteracting tension of the brake springs will cause member 36 to rock in a counterclockwise direction about pin 37, thus causing compression of spring 40. It would follow that upon reaching the limit of counterclockwise rotation of member 36 in respect to foot pedal 27 because of complete compression of spring 40, pedal 27 and member 36 would act as a single member for exerting tension upon rod 26 and the brakes could be applied by manual effort under these conditions. Such conditions would prevail only in the event that the power operating means comprising pneumatic suction 19 should fail to function for one cause or another.

Ordinarily, it is intended that the greater portion of the force necessary to cause operation of the brakes be exerted by the power operating means. For accomplishing this result I provide an arm 41, which may comprise an integral extension of member 36, which extends downwardly along the side of pedal 27 and has a portion 42 which rests upon the rear of hub 43, to which the pedal 27 is connected, in such a manner as to limit clockwise rotation of member 36 about pin 37. The lower end of the arm 41 is curved downwardly, Fig. 2 so as to terminate at a place approximately coaxial with the center of shaft 28. The end 44 of arm 41 has a swivel anchor 45 for fastening one end of a flexible connection 46 thereto. The normal position of member 36 is illustrated in Fig. 1, which shows the center of adjustable means 45 as being in alignment with the center of shaft 28. Flexible connection 46 is trained over a desired number of idler pulleys 47 and has its forward end connecting with stem 30 of control valve 16.

In the position shown, core member 29 is seated over port 15 and no action is taking place. When foot pedal 27 is depressed, the tension resulting from the reaction of brake springs and transmitted through rod 26 tends to cause pin 47 to rise and member 36 to rotate counterclockwise upon pin 37. This movement causes tension in connection 46 which operates upon core member 29 of control valve 16 to displace the same and cause communication between port 15 and port 18. Evacuation of the low pressure side of the pneumatic motor 19 is thereby caused and the brakes are applied. Further depression of the foot pedal causes further compression of spring 40 and greater displacement of swivel anchor 45 and greater displacement of core member 29 of control valve 16. Such action causes the pressure in conduit 17 and at the low pressure side of pneumatic motor 19 to be correspondingly lowered so that greater effort is exerted by the pneumatic motor in causing further application of the brakes. It is apparent from the foregoing explanation that the large proportion of the power desired to operate the brakes is provided by the pneumatic motor and that the only effort which the operator has to exert is that which is required to displace member 36 from its normal position, Fig. 1.

If the operator desires to maintain the brakes in a definite braking condition, he has only to maintain his foot in an approximately fixed position in which core member 29 is permitted to seat under the action of the suction in conduit 14, but atmospheric port 35 is maintained closed. A further release of the pressure exerted by the operator will permit member 36 to rotate clockwise and permit atmospheric port 35 to become opened and thereby afford an immediate release of the power effort previously exerted by the pneumatic motor 19.

I claim:

1. In combination, power operating means responsive to differences of pressure, a source of suction, valve means and conduits for controlling the operation of said power means by the suction of said source of suction, a pivotally mounted pedal, rodding operable by said power means and having connection with said pedal, said connection comprising a member carried by said pedal, an arm extending from said member and having a portion thereof overlying the pivotal axis of said pedal, and means connecting said valve means with said arm at a point co-extensive with the pivotal axis of said pedal when said member and said pedal are in a definite relation to each other.

2. In combination, power operating means responsive to differences of pressure, a source of suction, valve means and conduits for controlling the operation of said power means by the suction of said source of suction, a pivotally mounted pedal, rodding operable by said power means and having connection with said pedal, said connection comprising a member pivotally mounted upon said pedal and a rod connected with said member at a point off of the direct line between the pivotal support of said member and said rodding, an arm extending from said member and having a portion thereof overlying the pivotal axis of said pedal, and means connecting said valve means with said arm at a point co-extensive with the pivotal axis of said pedal when said members and said pedal are in a definite relation to each other.

3. In combination, power operating means responsive to differences of pressure, a source of suction, valve means and conduits for controlling the operation of said power means by the suction of said source of suction, a pivotally mounted pedal, rodding operable by said power means, a member pivotally mounted upon said pedal, a rod intermediate said rodding and said member and pivotally connected to said member at a point off of the direct line between the pivotal support of said member and said rodding, an arm extending from said member and having a portion thereof overlying the pivotal axis of said pedal, means connecting said valve means with said arm at a point co-extensive with the pivotal axis of said pedal when said member and said pedal are in a definite relation to one another, and resilient means for restoring said member to said definite relation to said pedal when the tension on said rod permits.

4. In combination, power operating means responsive to differences of pressure, a source of suction, valve means and conduits for controlling the operation of said power means by the suction of said source of suction, a pivotally mounted element, rodding operable by said power means, a member pivotally mounted upon said element, means having connection with said rodding and having one end pivotally connected to said member at a point out of line with the direct line between the pivotal support of said member and said rodding, an arm extending from said member and having a portion thereof overlying the pivotal axis of said element, resilient means coacting between said member and said element for affecting the relative relation of said member and said element and for restoring said member to its normal position, and means connecting said member with said valve means for controlling the operation of said valve means when said member is displaced relative to said element, said means having connection with the arm of said member at a point co-extensive with the pivotal axis of said element when said member and said element are in normal position.

5. In combination, power operating means responsive to differences of pressure, a source of suction, valve means and conduits for controlling the operation of said power means by the suction of said source of suction, a pivotally mounted element, rodding operable by said power means, a member pivotally mounted upon said element, means having connection with said rodding and having one end pivotally connected to said member at a point out of line with the direct line between the pivotal support of said member and said rodding, an arm extending from said member and having a portion thereof overlying the pivotal axis of said element, means for limiting rotation of said member in one direction in respect to said element, resilient means coacting between said member and said element exerting force against the rotation of said member in the other direction and for restoring said member to its normal position, and means connecting said member with said valve means for controlling the operation of said valve means when said member is displaced relative to said element, said means having connection with the arm of said member at a point co-extensive with the pivotal axis of said element when said member and said element are in normal position.

6. In combination, power operating means responsive to differences of pressure, a source of suction, valve means and conduits for controlling the operation of said power means by the suction of said source of suction, a pivotally mounted element, rodding operable by said power means, a member pivotally mounted upon said element, means having connection with said rodding and having one end pivotally connected to said member at a point out of line with the direct line between the pivotal support of said member and said rodding, an arm extending from said member and having a portion thereof overlying the pivotal axis of said element, means connecting said member with said valve means for controlling the operation of said valve means when said member is displaced relative to said element, said means having connection with the arm of said member at a point co-extensive with the pivotal axis of said element when said member and said element are in normal position, and force exerting means coacting between said member and said element for restoring said member to its normal position subsequent to a movement of said rodding.

7. In combination, power operating means responsive to differences of pressure, a source of suction, valve means and conduits for controlling the operation of said power means by the suction of said source of suction, a pivotally mounted brake pedal, rodding operable by said power means, a member pivotally mounted upon said pedal, means having connection with said rodding and having one end pivotally connected to said member at a point out of line with the direct line between the pivotal support of said member and said rodding, an arm extending from said member and having a portion thereof overlying the pivotal axis of said pedal, and means connecting said member with said valve means for controlling the operation of said valve means when said member is displaced relative to said pedal, said means having connection with the arm of said member at a point co-extensive with the pivotal axis of said pedal when said member and said pedal are in normal position, and resilient means coacting between said member and acting against displacement of said brake pedal and to return said member to its normal position when the rodding has been actuated by said power operating means.

WILLIAM H. TOPP.